US010662965B2

(12) United States Patent
Hirai et al.

(10) Patent No.: US 10,662,965 B2
(45) Date of Patent: May 26, 2020

(54) SEALING STRUCTURE AND TURBOCHARGER

(71) Applicant: IHI Corporation, Koto-ku (JP)

(72) Inventors: Yoshiaki Hirai, Tokyo (JP); Nobuyuki Ikeya, Tokyo (JP); Kouta Kimachi, Tokyo (JP)

(73) Assignee: IHI Corporation, Koto-ku (JP)

( * ) Notice: Subject to any disclaimer, the term of this patent is extended or adjusted under 35 U.S.C. 154(b) by 224 days.

(21) Appl. No.: 15/842,185

(22) Filed: Dec. 14, 2017

(65) Prior Publication Data
US 2018/0106265 A1    Apr. 19, 2018

Related U.S. Application Data

(63) Continuation of application No. PCT/JP2016/066370, filed on Jun. 2, 2016.

(30) Foreign Application Priority Data

Jun. 16, 2015    (JP) .................. 2015-120792

(51) Int. Cl.
*F04D 29/12*    (2006.01)
*F02B 37/24*    (2006.01)
(Continued)

(52) U.S. Cl.
CPC .............. *F04D 29/12* (2013.01); *F02B 37/22* (2013.01); *F02B 37/24* (2013.01); *F02B 39/14* (2013.01);
(Continued)

(58) Field of Classification Search
CPC .......... F16J 15/02; F16J 15/021; F16J 15/022; F16J 15/102; F16J 15/104; F16J 15/106;
(Continued)

(56) References Cited

U.S. PATENT DOCUMENTS 3,010,697 A * 11/1961 Lazo .................. F02C 6/12
                                                    415/135
3,043,636 A *  7/1962 MacInnes ............. F01D 25/166
                                                    384/287
(Continued)

FOREIGN PATENT DOCUMENTS

CH        582 318        11/1976
CN     1321225 A         11/2001
(Continued)

OTHER PUBLICATIONS

Combined Chinese Office Action and Search Report dated Dec. 21, 2018 in Chinese Patent Application No. 201680034883.5 (with English translation).

(Continued)

*Primary Examiner* — David E Sosnowski
*Assistant Examiner* — Eric J Zamora Alvarez
(74) *Attorney, Agent, or Firm* — Oblon, McClelland, Maier & Neustadt, L.L.P.

(57)    ABSTRACT

A sealing structure includes: an insertion hole formed in a sealing plate; a sealing ring provided in the insertion hole; a first rotating body provided to the shaft, at least a part of the first rotating body positioned inside the insertion hole; a second rotating body disposed at a position apart from the compressor impeller than the first rotating body and having a maximum outer diameter larger than a minimum inner diameter of the insertion hole; and an annular receiving groove formed by the first rotating body and the second rotating body and receiving an inner circumferential surface side of the sealing ring.

8 Claims, 4 Drawing Sheets

(51) Int. Cl.

| | | |
|---|---|---|
| *F04D 25/02* | (2006.01) | |
| *F04D 29/10* | (2006.01) | |
| *F02B 39/14* | (2006.01) | |
| *F02B 37/22* | (2006.01) | |
| *F04D 29/08* | (2006.01) | |

(52) U.S. Cl.
CPC ......... *F04D 25/024* (2013.01); *F04D 29/083* (2013.01); *F04D 29/102* (2013.01); *F04D 29/122* (2013.01); *Y02T 10/144* (2013.01)

(58) Field of Classification Search
CPC ..... F16J 15/3268; F04D 29/12; F04D 29/102; F04D 29/122; F04D 29/106; F04D 29/126; F05D 2240/55
USPC ........................................................ 415/290
See application file for complete search history.

(56) References Cited

U.S. PATENT DOCUMENTS

| | | | |
|---|---|---|---|
| 3,961,867 A | 6/1976 | Woollenweber | |
| 6,168,375 B1 | 1/2001 | Larue et al. | |
| 6,406,253 B2 | 6/2002 | Heyes | |
| 7,717,434 B2* | 5/2010 | Blessing | F16J 15/0887 277/608 |
| 7,837,448 B2* | 11/2010 | Shimizu | F01D 11/003 123/559.1 |
| 8,517,679 B2* | 8/2013 | Schlienger | F01D 11/003 277/434 |
| 9,915,172 B2* | 3/2018 | Annati | F01D 25/16 |
| 2007/0172365 A1 | 7/2007 | Shimizu et al. | |
| 2011/0162359 A1 | 7/2011 | Bochud et al. | |
| 2013/0108483 A1* | 5/2013 | Becker | F01D 25/166 417/313 |

FOREIGN PATENT DOCUMENTS

| | | |
|---|---|---|
| CN | 101008345 A | 8/2007 |
| CN | 102322304 A | 1/2012 |
| CN | 202707602 U | 1/2013 |
| CN | 204312394 U | 5/2015 |
| DE | 2 416 639 | 10/1974 |
| DE | 10 2010 029 048 A1 | 11/2011 |
| EP | 1 813 782 A1 | 8/2007 |
| FR | 2.224.652 | 10/1974 |
| GB | 1 430 308 | 3/1976 |
| JP | 50-30110 | 3/1975 |
| JP | 61-166134 U | 10/1986 |
| JP | 62-108542 U | 7/1987 |
| JP | 8-28290 | 1/1996 |
| JP | 2001-271651 | 10/2001 |
| JP | 2003-526037 | 9/2003 |
| JP | 2005-61621 | 3/2005 |
| JP | 2007-205253 | 8/2007 |
| JP | 2007-224900 | 9/2007 |
| JP | 2008-31949 | 2/2008 |
| JP | 2009-257378 | 11/2009 |
| JP | 4524050 | 8/2010 |
| JP | 2011-241817 | 12/2011 |
| JP | 2012-503155 | 2/2012 |
| JP | 2013-2294 | 1/2013 |
| JP | 2013-50090 | 3/2013 |
| JP | 2013-177852 | 9/2013 |
| WO | WO 00/19107 | 4/2000 |

OTHER PUBLICATIONS

Office Action dated Sep. 25, 2018 in Japanese Patent Application No. 2017-524802 (with English translation), 6 pages.
International Search Report dated Sep. 6, 2016 in PCT/JP2016/066370, filed on Jun. 2, 2016.
Written Opinion dated Sep. 6, 2016 in PCT/JP2016/066370, filed on Jun. 2, 2016.
International Preliminary Report on Patentability and Written Opinion dated Dec. 28, 2017 in PCT/JP2016/066370.

* cited by examiner

SEALING STRUCTURE AND TURBOCHARGER

CROSS REFERENCE TO RELATED APPLICATIONS

This application is a continuation application of International Application No. PCT/JP2016/066370, filed on Jun. 2, 2016, which claims priority to Japanese Patent Application No. 2015-120792, filed on Jun. 16, 2015, the entire contents of which are incorporated by reference herein.

BACKGROUND ART

Technical Field

The present disclosure relates to a sealing structure including a sealing ring and a turbocharger.

Related Art

In the related art, turbochargers which compress intake air by energy of exhaust gas and send the compressed intake air to an engine is widespread. In a turbocharger, a bearing side for pivotally supporting a shaft and a compressor impeller side for compressing intake air are partitioned by a sealing plate. An insertion hole into which the shaft is inserted is formed in a sealing plate, and a sealing structure with a sealing ring is provided in the insertion hole.

When a pressure ratio of intake air increases, deterioration of the sealing ring is promoted. Therefore, in a turbocharger described in Patent Literature 1, a protruding portion is provided on an inner circumferential surface of an insertion hole of a sealing ring, and movement of the sealing ring in an axial direction is restricted by the protruding portion, thereby suppressing deterioration of the sealing ring. Moreover, the sealing ring is inserted into the insertion hole in a state where an inner circumferential surface side thereof is received in a receiving groove formed on an outer circumferential surface of an oil thrower member. In the configuration of Patent Literature 1, the oil thrower member includes two members divided in the axial direction so that the oil thrower member can be inserted from the side opposite to the protruding portion in the insertion hole, and the sealing ring can be inserted from the side not interfering with the protruding portion. Moreover, some of sealing rings are provided with an abutment joint for facilitating elastic deformation of the sealing ring in a radial direction as described in Patent Literature 2.

CITATION LIST

Patent Literature

Patent Literature 1: Japanese Utility Model Application Laid-Open No. 61-166134
Patent Literature 2: Japanese Patent Application Laid-Open No. 8-28290

SUMMARY

Technical Problem

According to the sealing structure described in Patent Literature 1, an outer diameter of the oil thrower member is larger than an inner diameter of a receiving groove receiving the sealing ring. Therefore, in order to fit the sealing ring into the receiving groove, an abutment joint of a sealing ring described in Patent Literature 2 is separated. That is, it is required that, in a state where the inner diameter of the sealing ring is elastically deformed to be larger than the outer diameter of the oil thrower member, the sealing ring be fitted into the receiving groove in such a manner as to cross over the outer circumferential surface of the oil thrower member. Then, after the sealing ring is fitted to the receiving groove of the oil thrower member, the oil thrower member receives the shaft integrally with the sealing ring.

As described above, in the sealing structure described above, the assembling work may become complicated since it is necessary to sequentially perform two steps in assembling the oil thrower member. Thus, improvement in workability is desired.

An object of the present disclosure is to provide a sealing structure and a turbocharger capable of improving workability of assembling a sealing ring.

Solution to Problem

In order to solve the above problem, a sealing structure includes: a sealing plate disposed opposite to a back surface side of a compressor impeller fixed to a shaft and having an insertion hole; a sealing ring provided in the insertion hole; a first rotating body provided to the shaft, at least a part of the first rotating body positioned inside the insertion hole; a second rotating body disposed at a position, of the shaft, apart from the compressor impeller than the first rotating body and having a maximum outer diameter larger than a minimum inner diameter of the insertion hole; and an annular receiving groove formed by the first rotating body and the second rotating body and receiving an inner circumferential surface side of the sealing ring.

Alternatively, the first rotating body may be integrally formed with the compressor impeller.

Alternatively, an outer circumferential surface of the sealing ring may be provided with a plurality of protrusions protruding outward in a radial direction of the shaft while spaced apart from each other in a circumferential direction thereof.

Alternatively, the first rotating body may be integrally formed with the compressor impeller and that the outer circumferential surface of the sealing ring is provided with a plurality of protrusions protruding outward in the radial direction of the shaft while spaced apart from each other in the circumferential direction thereof.

Alternatively, a protruding portion protruding from the inner circumferential surface of the insertion hole may be included.

In order to solve the above problem, a turbocharger includes: a shaft; a compressor impeller fixed to the shaft; and a sealing structure having: a sealing plate disposed opposite to a back surface side of a compressor impeller fixed to a shaft and having an insertion hole; a sealing ring provided in the insertion hole; a first rotating body provided to the shaft, at least a part of the first rotating body positioned inside the insertion hole; a second rotating body disposed at a position, of the shaft, apart from the compressor impeller than the first rotating body and having a maximum outer diameter larger than a minimum inner diameter of the insertion hole; and an annular receiving groove formed by the first rotating body and the second rotating body and receiving an inner circumferential surface side of the sealing ring.

Alternatively, the first rotating body may be integrally formed with the compressor impeller.

Alternatively, an outer circumferential surface of the sealing ring may be provided with a plurality of protrusions protruding outward in the radial direction of the shaft while spaced apart from each other in a circumferential direction thereof.

Alternatively, the first rotating body may be integrally formed with the compressor impeller and that the outer circumferential surface of the sealing ring is provided with a plurality of protrusions protruding outward in the radial direction of the shaft while spaced apart from each other in the circumferential direction thereof.

Alternatively, a protruding portion protruding from the inner circumferential surface of the insertion hole may be included.

Advantageous Effects

According to the present disclosure, workability of assembling a sealing ring can be improved.

DESCRIPTION OF EMBODIMENTS

Reasonable embodiments will be described in detail below with reference to the accompanying drawings. Dimensions, materials, other specific numerical values, and the like illustrated in such embodiments are merely examples for facilitating understanding, and a configuration is not limited thereby except for a case where it is specifically mentioned. Note that, in the present specification and the drawings, elements having substantially the same function and configuration are denoted by the same symbol, and redundant explanations are omitted.

Figure 1:
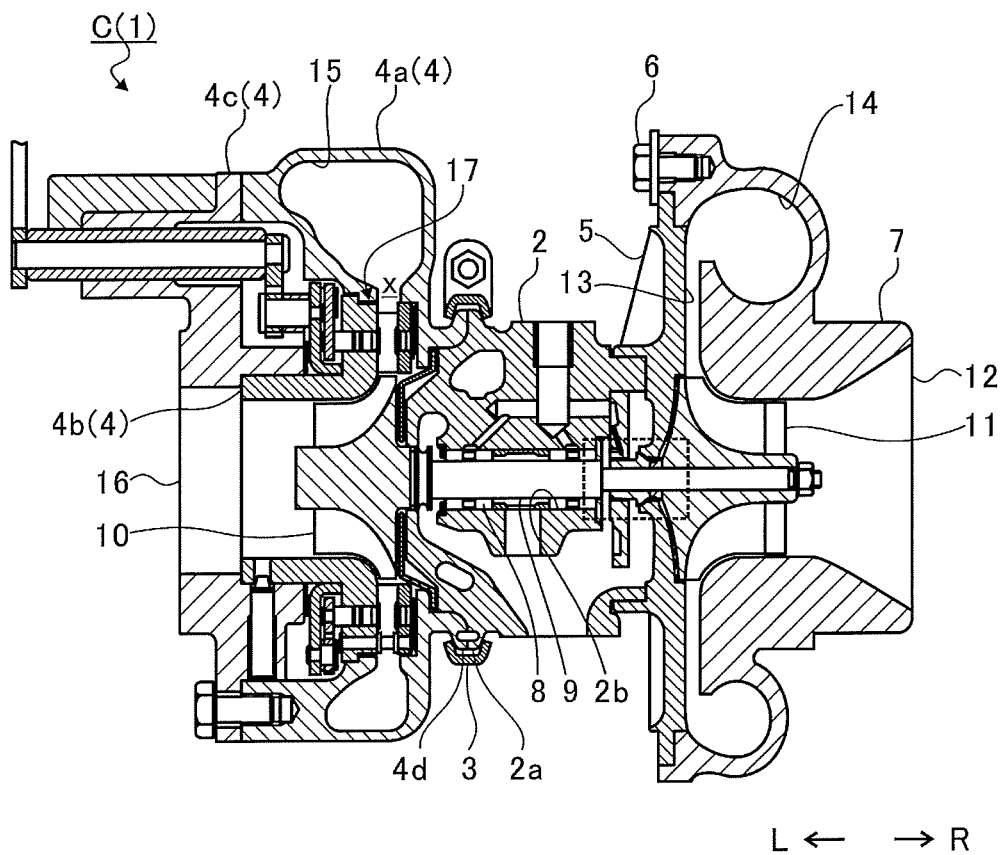
FIG. 1 is a schematic cross-sectional view of a turbocharger.

FIG. 1 is a schematic cross-sectional view of a turbocharger C. Hereinafter, descriptions are given assuming that a direction of an arrow L illustrated in FIG. 1 is a left side of the turbocharger C and that a direction of an arrow R is a right side of the turbocharger C. As illustrated in FIG. 1, the turbocharger C includes a turbocharger main body 1. In this turbocharger main body 1, a bearing housing 2, a turbine housing 4 connected to a left side of the bearing housing 2 by a fastening mechanism 3, a sealing plate 5 connected to a right side of the bearing housing 2, and a compressor housing 7 connected to the right side of the sealing plate 5 by a fastening bolt 6 are formed integrally. Here, the turbine housing 4 is formed by three housing members 4a, 4b, and 4c connected together.

A protrusion 2a protruding in the radial direction of the bearing housing 2 is provided on an outer circumferential surface of the bearing housing 2 in the vicinity of the turbine housing 4. A protrusion 4d protruding in the radial direction of the turbine housing 4 is provided on an outer circumferential surface of the turbine housing 4 in the vicinity of the bearing housing 2. In the bearing housing 2 and the turbine housing 4, the protrusions 2a and 4d are fixed by the fastening mechanism 3. The fastening mechanism 3 includes a fastening band (e.g. G coupling) for clamping the protrusions 2a and 4d.

In the bearing housing 2, a bearing hole 2b penetrating the turbocharger C in left and right directions is formed. A bearing 8 is accommodated in the bearing hole 2b, and the shaft 9 is pivotally supported by the bearing 8 in a freely rotatable manner. A turbine impeller 10 is integrally fixed to one end of the shaft 9. The turbine impeller 10 is accommodated in the turbine housing 4 in a freely rotatable manner. A compressor impeller 11 is integrally fixed to the other end of the shaft 9. The compressor impeller 11 is accommodated in the compressor housing 7 in a freely rotatable manner.

In the compressor housing 7, an intake port 12 which is opened to the right side of the turbocharger C and is connected to an air cleaner (not illustrated) is formed. In a state where the sealing plate 5 and the compressor housing 7 are connected by the fastening bolt 6, opposing surfaces of the sealing plate 5 and the compressor housing 7 form a diffuser flow passage 13 for pressurizing the air. The diffuser flow passage 13 is annularly formed from an inner side toward an outer side in the radial direction of the shaft 9 and communicates with the intake port 12 via the compressor impeller 11 at the inner side in the radial direction.

Inside the compressor housing 7, an annular compressor scroll flow passage 14 positioned on an outer side in the radial direction of the shaft 9 than the diffuser flow passage 13 is provided. The compressor scroll flow passage 14 communicates with an intake port of an engine (not illustrated) and also communicates with the diffuser flow passage 13. When the compressor impeller 11 rotates, the air is sucked into the compressor housing 7 from the intake port 12. The sucked air is pressurized by the diffuser flow passage 13 and the compressor scroll flow passage 14 and guided to the intake port of the engine. That is, the compressed air flows in the compressor scroll flow passage 14.

In the turbine housing 4, an annular turbine scroll flow passage 15 positioned on an outer side in the radial direction of the shaft 9 than the turbine impeller 10 is formed. A flow passage x is formed between the turbine impeller 10 and the turbine scroll flow passage 15. The flow passage x is annularly formed from an inner side toward an outer side in the radial direction of the shaft 9.

In the turbine housing 4, an exhaust port 16 communicating with the turbine scroll flow passage 15 via the turbine impeller 10, facing the front of the turbine impeller 10, and connected to an exhaust gas purifying device (not illustrated) is formed.

The turbine scroll flow passage 15 communicates with a gas inlet port (not illustrated) through which exhaust gas discharged from the engine is guided and also communicates with the flow passage x described above. Therefore, the exhaust gas guided from the gas inlet port to the turbine scroll flow passage 15 is guided to the exhaust port 16 via the flow passage x and the turbine impeller 10 and rotates the turbine impeller 10 while flowing therein. The rotating force of the turbine impeller 10 is then transmitted to the compressor impeller 11 via the shaft 9. When the compressor impeller 11 rotates, the air is pressurized and guided to the intake port of the engine as described above.

At this time, when a flow rate of the exhaust gas guided to the turbine housing 4 changes, the rotation amounts of the turbine impeller 10 and the compressor impeller 11 change.

Depending on an operation status of the engine, there may be a case where the air pressurized to a desired pressure cannot be sufficiently guided to the intake port of the engine. Therefore, in the flow passage x of the turbine housing 4, a variable stationary blade mechanism 17 that makes the degree of communication between the turbine scroll flow passage 15 and the exhaust port 16 variable is provided.

The variable stationary blade mechanism 17 changes the flow velocity of exhaust gas guided to the turbine impeller 10 in accordance with the flow rate of exhaust gas. Specifically, in the variable stationary blade mechanism 17, when the rotational speed of the engine is low and the flow rate of the exhaust gas is small, the opening degree of the flow passage x is reduced to improve the flow velocity of the exhaust gas guided to the turbine impeller 10, so that the turbine impeller 10 can be rotated even with a small flow rate.

Figure 2:
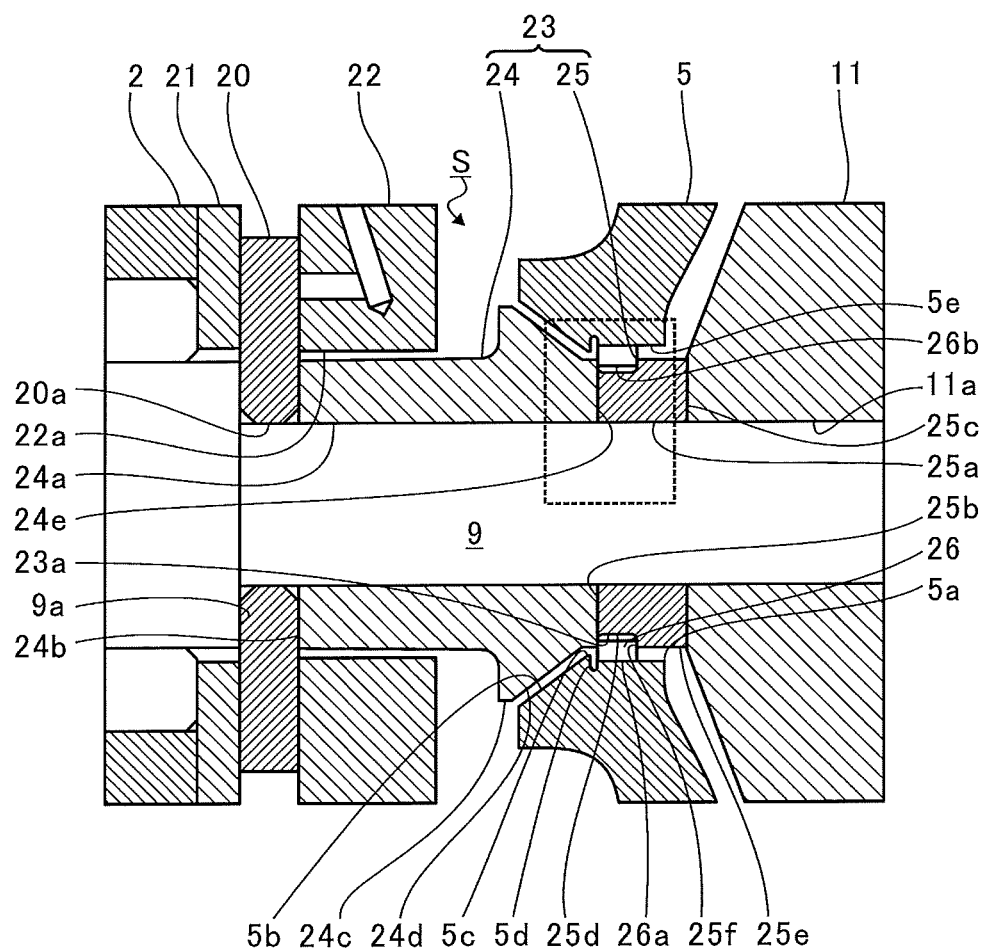
FIG. 2 is an extracted diagram of a broken line part in FIG. 1.

FIG. 2 is an extracted diagram of a broken line part in FIG. 1. As illustrated in FIG. 2, a thrust collar 20 is fixed to the shaft 9. The thrust collar 20 is formed with a collar hole 20a into which the shaft 9 is inserted, and the shaft 9 is inserted into the collar hole 20a up to a position where the thrust collar 20 comes into contact with a step surface 9a formed by a difference in outer diameter formed on the shaft 9. The thrust collar 20 is fixed to the shaft 9 and applies a thrust load to two thrust bearings 21 and 22 disposed with the thrust collar 20 interposed there-between.

The compressor impeller 11 includes an impeller hole 11a into which the shaft 9 is inserted. The compressor impeller 11 is fixed to the shaft 9 in a state where the shaft 9 is inserted into the impeller hole 11a. A side of the compressor impeller 11 opposite to the intake port 12 is disposed with the sealing plate 5 in an opposing manner. That is, the sealing plate 5 is disposed with a back surface side of the compressor impeller 11 in an opposing manner. The thrust bearing 22 side and the compressor impeller 11 side are partitioned by the sealing plate 5.

An insertion hole 5a penetrating through in the axial direction of the shaft 9 is formed in the sealing plate 5. An oil thrower member 23 (rotating body) is fixed to the shaft 9. The shaft 9 is inserted into the insertion hole 5a with the oil thrower member 23 interposed there-between. In the insertion hole 5a, a thrust bearing 22 side is exposed to lubricating oil and the compressor impeller 11 side is exposed to high pressure air. Therefore, a sealing structure S is provided to suppress leakage of the lubricating oil and the air. Hereinafter, this sealing structure S will be described in detail.

In the thrust bearing 22 on the compressor impeller 11 side (right side in FIG. 2), a thrust hole 22a having an inner diameter smaller than the outer diameter of the thrust collar 20 is formed, and the oil thrower member 23 is inserted into the thrust hole 22a.

The oil thrower member 23 is inserted into the insertion hole 5a and rotates integrally with the shaft 9. Specifically, the oil thrower member 23 includes a thrust side rotating body 24 (second rotating body) on the thrust collar 20 side and a compressor side rotating body 25 (first rotating body) on the compressor impeller 11 side. A first hole 24a into which the shaft 9 is inserted is formed in the thrust side rotating body 24. The shaft 9 is inserted into the first hole 24a up to a position where one end 24b of the thrust side rotating body 24 comes into contact with the thrust collar 20. The thrust side rotating body 24 is fixed to the shaft 9. The one end 24b side of the thrust side rotating body 24 is inserted into the thrust hole 22a.

The thrust side rotating body 24 is formed with an annular protrusion 24c at a part closer to the compressor impeller 11 side than a part inserted into the thrust hole 22a. The annular protrusion 24c has a larger outer diameter than that of the thrust hole 22a and scatters the lubricating oil flowing from the thrust bearing 22 side radially outward from the annular protrusion 24c by centrifugal force.

The annular protrusion 24c is provided with a reduced diameter portion 24d whose outer diameter decreases toward the compressor impeller 11 side. A part of the reduced diameter portion 24d and the other end 24e are positioned inside the insertion hole 5a formed in the sealing plate 5.

On the compressor impeller 11 side of the thrust side rotating body 24, the compressor side rotating body 25 is disposed. In the compressor side rotating body 25, a second hole 25a into which the shaft 9 is inserted is formed, the same as in the thrust side rotating body 24. An one end 25b of the compressor side rotating body 25 is in contact with the other end 24e of the thrust side rotating body 24. At this position, the compressor side rotating body 25 is fixed to the shaft 9 inserted into the second hole 25a. Here, the one end 25b side of the compressor side rotating body 25 is positioned inside the insertion hole 5a, and the other end 25c side protrudes from the insertion hole 5a and comes into contact with the compressor impeller 11. That is, at least a part of the compressor side rotating body 25 is positioned inside the insertion hole 5a. The thrust side rotating body 24 is arranged on a side, of the shaft 9, opposite to the compressor impeller 11 when seen from the compressor side rotating body 25.

A small diameter portion 25d and a large diameter portion 25e are formed on an outer circumferential surface of the compressor side rotating body 25. The small diameter portion 25d extends from the one end 25b toward the other end 25c, and the large diameter portion 25e extends from the other end 25c toward the small diameter portion 25d. The small diameter portion 25d has an outer diameter smaller than that of the large diameter portion 25e, and a step surface 25f formed by a difference in outer diameter is provided at a boundary between the small diameter portion 25d and the large diameter portion 25e.

On an inner circumferential surface of the insertion hole 5a of the sealing plate 5, a tapered portion 5b is formed at a portion facing the reduced diameter portion 24d in the radial direction. The tapered portion 5b is inclined while maintaining a space from the reduced diameter portion 24d roughly constant. A protruding portion 5c is formed at an end portion of the tapered portion 5b on the compressor impeller 11 side. The protruding portion 5c protrudes inward in the radial direction of the shaft 9 from the inner circumferential surface of the insertion hole 5a, and an inner diameter of the protruding portion 5c is the minimum inner diameter of the insertion hole 5a.

On the compressor impeller 11 side of the protruding portion 5c, a plate groove 5d recessed radially outward is formed. Furthermore, a parallel portion 5e extends parallel to the axial direction on the compressor impeller 11 side from the plate groove 5d. An inner diameter of the parallel portion 5e is larger than that of the protruding portion 5c and smaller than that of the plate groove 5d. In the parallel portion 5e, the sealing ring 26 is disposed in a state where the sealing ring 26 is contracted inward in the radial direction than the natural length (uncompressed state). An outer circumferential surface 26a of the sealing ring 26 is in contact with the parallel portion 5e while pressing against the parallel portion 5e by elastic force of the sealing ring 26 itself. The inner circumferential surface 26b side of the sealing ring 26 is received in an annular receiving groove 23a formed on the outer circumferential surface of the oil thrower member 23.

Inner walls of the receiving groove 23a are formed by both of the thrust side rotating body 24 and the compressor side rotating body 25. Here, out of the inner walls of the receiving groove 23a, a wall surface on the thrust bearing 22 side is formed by the other end 24e of the thrust side rotating body 24, a bottom surface is formed by the small diameter portion 25d of the compressor side rotating body 25, and a wall surface on the compressor impeller 11 side is formed by the step surface 25f of the compressor side rotating body 25.

Here, an example of a process of attaching the oil thrower member 23 and other components to the shaft 9 will be described. First, the shaft 9 is inserted into the bearing hole 2b of the bearing housing 2 from the turbine housing 4 side. While a tip of the shaft 9 protrudes from the bearing hole 2b, the shaft 9 is inserted into the collar hole 20a until the thrust collar 20 comes into contact with a step surface 9a. The shaft 9 is then inserted into the thrust hole 22a of the thrust bearing 22 to fix the thrust bearing 22 to the bearing housing 2.

In the oil thrower member 23, the thrust side rotating body 24 has the maximum outer diameter of the annular protrusion 24c larger than the minimum inner diameter of the insertion hole 5a. For this reason, the thrust side rotating body 24 cannot entirely pass through the insertion hole 5a from the compressor impeller 11 side. Therefore, the thrust side rotating body 24 needs to receive the shaft 9 before the sealing plate 5 does.

Therefore, first, the shaft 9 is inserted into the first hole 24a of the thrust side rotating body 24. The one end 24b side of the thrust side rotating body 24 is further inserted into the thrust hole 22a of the thrust bearing 22. Thereafter, the shaft 9 is inserted into the insertion hole 5a of the sealing plate 5. Furthermore, the other end 24e side of the thrust side rotating body 24 is positioned inside the insertion hole 5a. The sealing plate 5 is then fixed to the bearing housing 2.

The sealing ring 26 is contracted radially inward and inserted into the insertion hole 5a of the sealing plate 5, and the second hole 25a of the compressor side rotating body 25 receives the shaft 9. Here, the one end 25b side of the compressor side rotating body 25 is inserted though the insertion hole 5a. Here, the sealing ring 26 has an abutment joint, and the outer diameter of the sealing ring 26 in the natural length before insertion is larger than an inner diameter of the insertion hole 5a of the sealing plate 5. Furthermore, after the shaft 9 is inserted into the impeller hole 11a of the compressor impeller 11, a bolt is fastened to a tip of the shaft 9. In this manner, the thrust collar 20, the oil thrower member 23, and the compressor impeller 11 are interposed between the step surface 9a of the shaft 9 and the bolt fastened to the tip of the shaft 9. These members are clamped by axial force associated with fastening of the bolt.

Thus, after the thrust side rotating body 24 is attached to the shaft 9, the sealing plate 5 and the compressor side rotating body 25 are sequentially attached to the shaft 9. As a result, the thrust side rotating body 24 is inserted in the side opposite to the compressor impeller 11 side with respect to the insertion hole 5a of the sealing plate 5. Also, the compressor side rotating body 25 is inserted in the compressor impeller 11 side with respect to the insertion hole 5a of the sealing plate 5.

For example, in the case where the receiving groove 23a is not provided in the thrust side rotating body 24 but the sealing ring 26 is fitted into a receiving groove 23a provided in the compressor side rotating body 25, the sealing ring 26 needs to be enlarged in the radial direction by a jig. This disadvantageously complicates the work. In the present embodiment, the inner walls of the receiving groove 23a of the oil thrower member 23 is formed by the thrust side rotating body 24 and the compressor side rotating body 25. Therefore, after positioning the thrust side rotating body 24 and the sealing ring 26 in the insertion hole 5a, the compressor side rotating body 25 can be inserted into the insertion hole 5a. Therefore, it is not necessary to attach the sealing ring 26 to the receiving groove 23a in advance, and thus workability can be improved.

Since the sealing ring 26 is inserted from the compressor impeller 11 side of the insertion hole 5a of the sealing plate 5 with respect to the protruding portion 5c, the sealing ring 26 does not interfere with the protruding portion 5c. It is also conceivable to insert the sealing ring 26 from the left side to the right side in FIG. 2 with respect to the insertion hole 5a in such a manner as to cross over the protruding portion 5c. In this case, in order for a gap in the abutment joint to remain slightly even when the outer diameter of the sealing ring 26 is contracted radially inward to the same diameter as the inner diameter of the protruding portion 5c, the size of the abutment joint needs to be increased, for example. In other words, at the time of insertion, the size of the gap in the abutment joint needs to be increased before insertion such that both end portions of the sealing ring forming the abutment joint are prevented from contacting each other and that the sealing ring is prevented from being abnormally deformed. In the present embodiment, since the sealing ring 26 is inserted into the insertion hole 5a from the compressor impeller 11 side, there is no need to increase the size of the gap in the abutment joint of the sealing ring 26 before insertion. Therefore, as described above, it is possible to improve workability and, secondarily, to suppress deterioration of the sealing property.

Figure 3A:
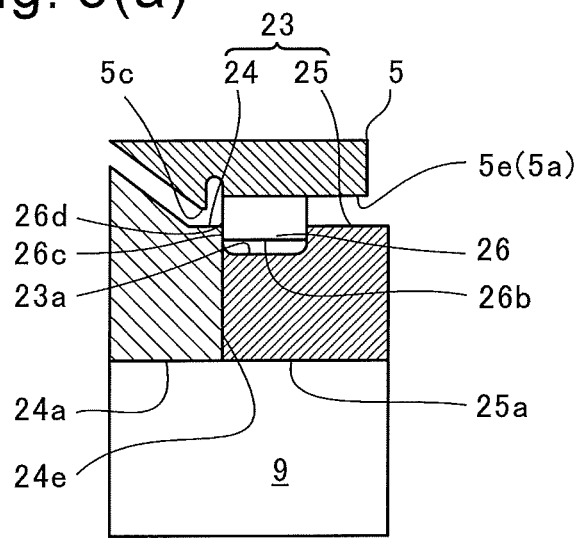
FIG. 3(a) is a diagram illustrating a broken line part of FIG. 2 by extracting it.
Figure 3B:
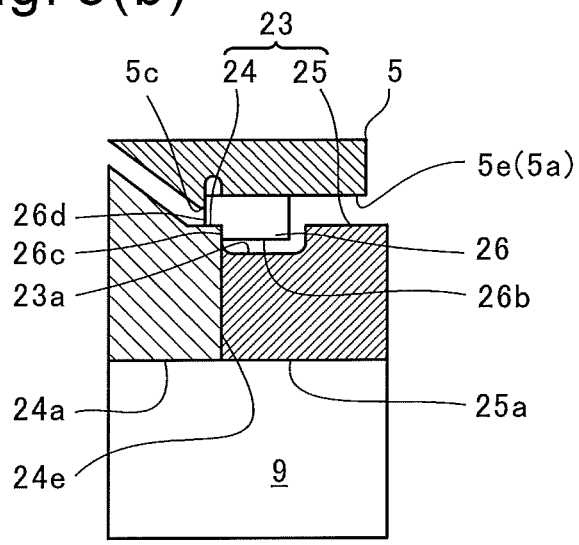
FIG. 3(b) is a diagram explaining abrasion of a sealing ring.

FIG. 3(a) is a diagram illustrating a broken line part of FIG. 2 by extracting it, and FIG. 3(b) is a diagram for explaining abrasion of the sealing ring 26. As illustrated in FIG. 3(a), the inner circumferential surface 26b side of the sealing ring 26 is received in the receiving groove 23a. When the shaft 9 rotates, the oil thrower member 23 (receiving groove 23a) rotates together with the shaft 9.

The sealing ring 26 is held by being in contact with and pressed against the parallel portion 5e of the insertion hole 5a, which is a stationary portion, by elastic force. Therefore, when the receiving groove 23a, which is a rotating portion, comes into contact with the sealing ring 26, the contacting portion may be abrased depending on operation conditions. In particular, when the pressure ratio of the intake air increases, the sealing ring 26 is pressed toward the turbine impeller 10 (left side in FIG. 3(a)) side by intake pressure. Therefore, in the sealing ring 26, abrasion of a portion 26c in contact with the other end 24e of the thrust side rotating body 24 out of the inner walls of the receiving groove 23a tends to progress.

As a result, as illustrated in FIG. 3(b), at a position where an end surface 26d of the sealing ring 26 on the turbine impeller 10 side is in contact with the protruding portion 5c of the insertion hole 5a, movement of the sealing ring 26 toward the turbine impeller 10 side (side opposite to the compressor impeller 11) is restricted by the protruding portion 5c. Therefore, after the state of FIG. 3(b) is reached, abrasion of the sealing ring 26 is suppressed, and the sealing property is improved.

In this manner, the sealing structure S employs a so-called step bore structure in which movement of the sealing ring 26 in the axial direction is restricted by the protruding portion 5c. The sealing structure S can improve the workability of assembling of the sealing ring 26 while suppressing abrasion of the sealing ring 26 and improving the sealing property.

Figure 4:
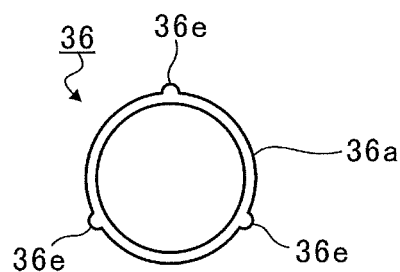
FIG. 4 is a front view of a sealing ring of a first modification.

FIG. 4 is a front view of a sealing ring 36 of a first modification. As illustrated in FIG. 4, the configuration described above can also be applied to the sealing ring 36 not including an abutment joint. On an outer circumferential surface 36a of the sealing ring 36, a plurality of (here, three) protrusions 36e protruding outward in a radial direction of the shaft 9 from the outer circumferential surface 36a are provided while spaced apart from each other (here, at equal intervals) in a circumferential direction of the outer circumferential surface 36a.

Before inserting the sealing ring 36 into an insertion hole 5a, the protrusions 36e protrude outward in the radial direction from the insertion hole 5a. The sealing ring 36 is inserted into the insertion hole 5a by elastic deformation of the protrusions 36e. That is, the sealing ring 36 is held in the insertion hole 5a in a state where the protrusions 36e are elastically deformed. In this way, the sealing ring 36 can be easily fixed to the insertion hole 5a, and thus workability can be further improved. Here, instead of press-fitting of the entire circumference of the sealing ring 36, by providing the plurality of protrusions 36e that are spaced apart in the circumferential direction and press-fitting and fixing the sealing ring 36 in and to the insertion hole 5a, holding force of the sealing ring 36 can be moderately lowered. As a result, deformation of the sealing ring 36 due to a load applied to the sealing ring 36 at the time of press fitting or operation can be reduced. Therefore, the sealing ring 36 is not required to include an abutment joint. In this manner, by providing the plurality of protrusions 36e in place of the abutment joint, the sealing property of the sealing ring 36 can be improved as compared to the case of providing the abutment joint.

Figure 5A:
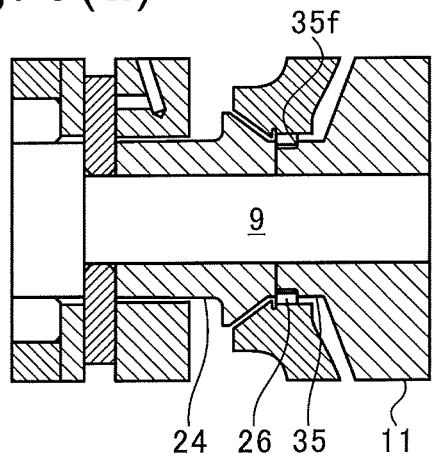
FIG. 5(a) is an explanatory diagram for explaining a second modification.

In a second modification illustrated in FIG. 5(a), a compressor side rotating body 35 is integrally formed with a compressor impeller 11. Therefore, it is possible to reduce the number of parts and to reduce the cost. The compressor side rotating body 35 integrally formed with the compressor impeller 11 may be formed of an aluminum alloy or the like similarly to the compressor impeller 11. A sealing ring 26 is pressed toward the turbine impeller 10 side (the left side in FIG. 5(a)) by the intake pressure during operation. Therefore, one end 24e of a thrust side rotating body 24 comes into contact with the sealing ring 26. Even when the compressor side rotating body 35 is formed of an aluminum alloy or the like, abrasion of the compressor side rotating body 35 due to abrasion with the sealing ring 26 can be suppressed.

Figure 5B:
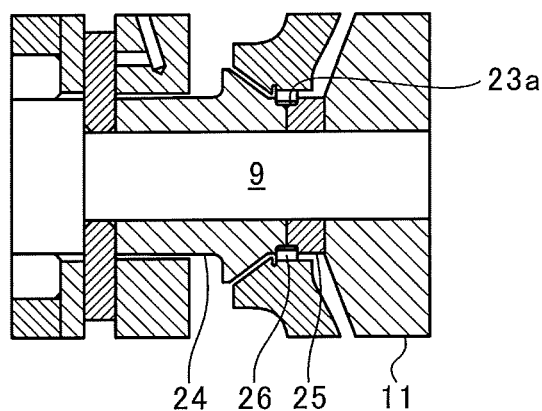
FIG. 5(b) is an explanatory diagram for explaining a third modification.
Figure 5C:
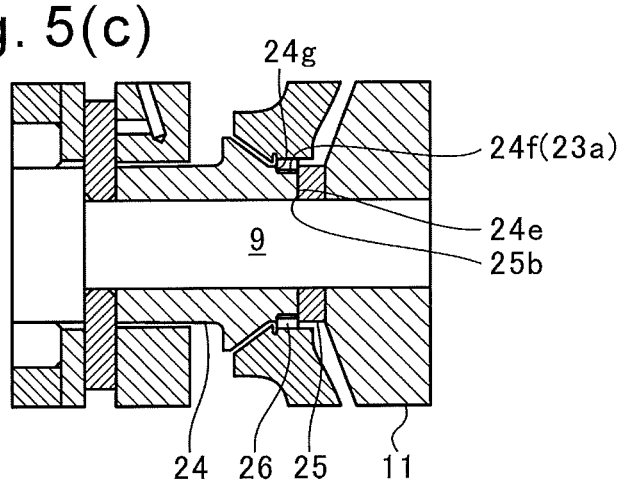
FIG. 5(c) is an explanatory diagram for explaining a fourth modification.

In a third modification illustrated in FIG. 5(b), a boundary between a thrust side rotating body 24 and a compressor side rotating body 25 is positioned in approximately the central portion of a receiving groove 23a in the axial direction of a shaft 9. Furthermore, in a fourth modification illustrated in FIG. 5(c), a small diameter portion 24f is formed on a thrust side rotating body 24 side. Moreover, out of inner walls of the receiving groove 23a, a wall surface on a thrust bearing 22 side is formed by a step surface 24g formed on an outer circumferential surface of the thrust side rotating body 24, a bottom surface is formed by the small diameter portion 24f of the thrust side rotating body 24, and a wall surface on the compressor impeller 11 side is formed by one end 25b of the compressor side rotating body 25.

As illustrated in the third modification and the fourth modification, as long as the inner walls of the receiving groove 23a are formed by both of the thrust side rotating body 24 and the compressor side rotating body 25, the boundary between the thrust side rotating body 24 and the compressor side rotating body 25 may be at any position in the axial direction of the receiving groove 23a. Furthermore, the configuration of the compressor side rotating body 35 integrally formed with the compressor impeller 11 as in the second modification may be applied to the third modification and the fourth modification.

Although the reasonable embodiments have been described with reference to the accompanying drawings, it is naturally understood that the respective configurations are not limited to the above embodiments. It is clear that those skilled in the art can conceive various modifications or variations within the scope described in the claims, and it is understood that they are naturally also within the technical scope.

What is claimed is:

1. A sealing structure comprising:
   a sealing plate disposed opposite to a back surface side of a compressor impeller fixed to a shaft and having an insertion hole;
   a sealing ring provided in the insertion hole;
   a first rotating body provided on the shaft, at least a part of the first rotating body positioned inside the insertion hole;
   a second rotating body is disposed at a position on the shaft farther from the compressor impeller than the first rotating body, the second rotating body having a maximum outer diameter larger than a minimum inner diameter of the insertion hole;
   an annular receiving groove formed by the first rotating body and the second rotating body and receiving an inner circumferential surface side of the sealing ring;
   a protruding portion protruding from an inner circumferential surface of the insertion hole; and
   a plate groove provided on a compressor impeller side of the protruding portion, the plate groove being recessed radially outward from the insertion hole.

2. The sealing structure according to claim 1, wherein the first rotating body is integrally formed with the compressor impeller.

3. The sealing structure according to claim 1, wherein an outer circumferential surface of the sealing ring is provided with a plurality of protrusions protruding outward in a radial direction of the shaft while spaced apart from each other in a circumferential direction thereof.

4. The sealing structure according to claim 1, wherein
   the first rotating body is integrally formed with the compressor impeller, and
   an outer circumferential surface of the sealing ring is provided with a plurality of protrusions protruding outward in a radial direction of the shaft while spaced apart from each other in a circumferential direction thereof.

5. A turbocharger comprising:
   the sealing structure according to claim 1.

6. The turbocharger according to claim 5, wherein the first rotating body is integrally formed with the compressor impeller.

7. The turbocharger according to claim 5, wherein an outer circumferential surface of the sealing ring is provided with a plurality of protrusions protruding outward in a radial direction of the shaft while spaced apart from each other in a circumferential direction thereof.

8. The turbocharger according to claim 5, wherein
   the first rotating body is integrally formed with the compressor impeller, and an outer circumferential surface of the sealing ring is provided with a plurality of protrusions protruding outward in a radial direction of the shaft while spaced apart from each other in a circumferential direction thereof.

* * * * *